United States Patent [19]

Ogino et al.

[11] Patent Number: 5,173,593
[45] Date of Patent: Dec. 22, 1992

[54] ELECTRIC CIGAR LIGHTER HAVING A THERMAL SAFETY FUSE

[75] Inventors: Tutomu Ogino, Omiya; Akio Nakamura, Kitamoto, both of Japan

[73] Assignee: Shin-Etxu Polymer Co., Ltd., Tokyo, Japan

[21] Appl. No.: 627,004

[22] Filed: Dec. 13, 1990

[30] Foreign Application Priority Data

Dec. 28, 1989 [JP] Japan .................... 1-338567

[51] Int. Cl.$^5$ ............. H05B 1/02; H01H 85/055; H01H 37/76; B60N 3/00
[52] U.S. Cl. ................ 219/264; 219/265; 219/517; 337/401; 337/404; 337/416
[58] Field of Search ............... 219/260–270, 219/517; 337/401, 416, 404

[56] References Cited

U.S. PATENT DOCUMENTS

| | | | |
|---|---|---|---|
| 2,858,409 | 10/1958 | Dening | 219/264 |
| 3,641,469 | 2/1972 | Pramaggiore | 219/263 X |
| 3,829,812 | 8/1974 | Inaba | 219/264 X |
| 4,459,464 | 7/1984 | Oda et al. | 219/264 |

FOREIGN PATENT DOCUMENTS 2645818 7/1977 Fed. Rep. of Germany ...... 219/264

*Primary Examiner*—Anthony Bartis
*Attorney, Agent, or Firm*—Wyatt, Gerber, Burke & Badie

[57] ABSTRACT

A car-borne electric cigar lighter includes a receptacle having a spring contact for receiving the heater element of the lighter for energization. A pair of spaced electrically conductive connecting plates form part of the electrical circuit to the spring contact. A circuit breakable electrically conductive spacer including a heat resistant, form-retaining resilient plate of an electrically insulating rubber, e.g., silicone rubber, penetrated between opposite surfaces with a thermally fusible, electrically conductive portion made from a low melting point metal, e.g., tin foils, to be in contact with the two connecting plates on both sides of the spacer forms an electrical connection between the plates through the tin foils. In case of overheating, the tin foils are melted down to open the electric circuit to the spring contact without losing the mechanical integrity of the spacer to serve as an insulator between the connecting plates.

5 Claims, 5 Drawing Sheets

5,173,593

ELECTRIC CIGAR LIGHTER HAVING A THERMAL SAFETY FUSE

BACKGROUND OF THE INVENTION

The present invention relates to an improved electric cigar lighter or, more particularly, to an improved car-borne electric cigar lighter in which the electric circuit is closed by pushing and inserting a heater element into a spring contact so that the filament of the heater element is red-heated to facilitate lighting of a cigar or cigarette.

Most of automobiles are equipped with an electric cigar lighter built in the dashboard and the driver of the automobile can light his cigar or cigarette even during driving by using his single hand. The electric cigar lighter of this type is constructed from two parts including a heater element having a spiral filament and a spring contact which is electrically insulated from the car body and connected to the positive terminal of the car battery. When the heater element is pushed and inserted into the spring contact to be held therein, one of the terminals of the heater element is contacted with the spring contact while the other is in electrical contact with the car body connected to the negative terminal of the battery so as to close an electric circuit through which an electric current is passed to red-heat the spiral filament of the heater element.

FIG. 1 of the accompanying drawing shows an equivalent circuit of such a cigar lighter in which the switch 52 connected to the positive terminal of the battery and the switch 53 connected to the car body or the negative terminal of the battery are simultaneously closed by pushing and inserting the heater element with the filament 51 into the spring contact so that the filament 51 is red-heated to facilitate lighting of a cigar or cigarette.

FIG. 4 illustrates a perspective view of such a spring contact disassembled into parts. A spring receptacle 1 located just below the dashboard opening of a car has two vanes 1',1' made of a bimetal, between which the head of the heater element illustrated in FIG. 3 is inserted to be in contact therewith so that the electric circuit is closed. The bimetal vanes 1',1' are made usually from phosphor bronze having a thermal expansion coefficient of $18 \times 10^{-8}$ cm/cm.°C. as the high-expansion metal and Invar or 42 Alloy having a thermal expansion coefficient of $1.2 \times 10^{-6}$ cm/cm.°C. and $5 \times 10^{-6}$ cm/cm.°C., respectively, as the low-expansion metal. When the temperature of the heater element is increased and reaches a certain elevated temperature, the bimetal vanes 1',1' are bent outwardly and lose contact with the heater element so as to open the circuit and prevent overheating. The spiral filament in the heater element is usually made of a resistance wire of an iron-chromium alloy having a volume resistivity of $1.2 \times 10^{-4}$ ohm.cm and can be red-heated when an electric current of several amperes or 10 amperes at the largest is passed therethrough.

Following is a more detailed description of the structure of such a car-borne electric cigar lighter. It is usual that the electric cigar lighter of this type has a thermal fuse built in the spring contact as a safety means as is shown by the equivalent circuit illustrated in FIG. 2 having such a thermal fuse 9 which is melted down to open the electric circuit when the lighter is overheated. The structure of a conventional spring contact having such a thermal fuse is illustrated in FIG. 4 showing the spring contact disassembled into parts, in which the bimetal receptacle 1 is connected to a screw bolt 2 usually made from mild steel which penetrates the openings in an insulator 3 made from a ceramic, e.g., alumina, a connecting lug plate 4 having an opening of a larger diameter than the bolt 2, a mica-made insulating spacer 5, a connecting plate 4' and a spring washer 6 of mild steel and fastens them together by screwing a nut 7 thereto. The connecting lug plate 4 is electrically connected to the positive terminal of the car battery and the conduction between the connecting plates 4 and 4' is obtained through a thermal fuse 9 which at each end is inserted into and held by caulking at the caulking ears 8 and 8' on the connecting plates 4, 4', respectively, so as to ensure electric conduction to the bimetal receptacle 1.

When the head of the heater element 11, as shown in FIG. 3 is inserted into the bimetal receptacle 1 shown in FIG. 4 and contacted with the vanes 1',1', the electric current passes through the circuit of: the positive terminal of the battery, connecting lug plate 4, thermal fuse 9, connecting plate 4', spring washer 6 and nut 7, bolt 2, bimetal receptacle 1, spiral filament of the heater element and car body which in turn is connected to the negative terminal of the battery.

When the spiral filament of the heater element is heated in the above described manner to exceed a temperature of about 800° to 900° C. which is high enough for lighting of a cigar or cigarette, the bimetal vanes 1',1' are bent outwardly so as to automatically release the heater element from the receptacle and open the electric circuit. It is a rare but possible accident that the vanes 1',1' do not come off from contact with the head of the heater element even when the temperature is sufficiently high depending on the inserting condition of the heater element into the spring contact by any chance resulting in overheating. In such an accident of overheating, the heat of the heater element is conducted through the bolt 2, nut 7 and the like to the thermal fuse 9 which is then melted down to open the electric circuit and prevent further overheating resulting in a hazard of fire. In an ordinary operating condition, the thermal fuse 9, which is made from a wire of a low melting-point alloy of tin and lead having a melting point of 200° to 300° C. and has a sleeve of a thermo-plastic resin such as polyethylene, is thermally insulated from the heater element with the ceramic insulator 3 interposed therebetween so as to be prevented from untimely melting down.

The conventional car-borne electric cigar lighter of the above described type has disadvantages in several respects as a consequence of the use of a thermal fuse 9 as a safety means which connects the connecting plates 4,4' fastened together with an insulating mica spacer 5 interposed therebetween. Even by setting aside the disadvantage that a thermal fuse must be prepared separately for each lighter, the connecting plates 4,4' must be provided with the caulking ears 8,8', respectively, by means of which the thermal fuse 9 is mounted by caulking to bridge the connecting plates 4,4' after the other parts have been assembled together taking an additional labor in the line of the assemblage works.

SUMMARY OF THE INVENTION

The present invention accordingly has an object to provide a novel and reliable car borne electric cigar lighter improved in connection with the thermal fuse as a safety means free from the above mentioned disadvantages in the conventional electric cigar lighters.

Thus, the invention provides an improvement in an electric cigar lighter consisting of a heater element having a heating filament and a spring contact. The heating filament has an electric circuit which is closed when the heater element is pushed and inserted into the spring contact. The electric cigar lighter comprises, in the spring contact, two connecting plates as parts of the electric circuit. These plates are fastened together with a spacer interposed therebetween and electrically connected through a thermal fuse means. The aforementioned improvement comprises the use of a spacer that is a plate of an electrically insulating rubbery material which is penetrated by an electrically conductive portion made from a metal or alloy having a low melting point between the surfaces in contact with the respective connecting plates. This establishes conduction between the connecting plates so as to serve as a thermal fuse means by melting down of at least one electrically conductive portion at an excessively high temperature with the spacer retaining its plate form to serve as an electrically insulating spacer between said connecting plates.

BRIEF DESCRIPTION OF THE INVENTION

DETAILED DESCRIPTION OF THE PREFERRED EMBODIMENTS

As is understood from the above given description, the most characteristic feature in the electric cigar lighter provided by the invention consists in the specific thermal fuse means to ensure safety. Namely, the thermal fuse in the conventional cigar lighter, by which two connecting plates fastened together with an insulating spacer interposed therebetween are electrically connected, is omitted and the roles played by the thermal fuse and the insulating spacer are taken over by a single specific spacer, referred to as a circuit-breakable conductive spacer hereinbelow, which forms a part of the electric circuit in an ordinary operating condition but opens the circuit acting as a thermal fuse in an accidental overheating.

In the following, the improvement provided by the invention is illustrated in more detail with reference to the accompanying drawing.

Figure 1:
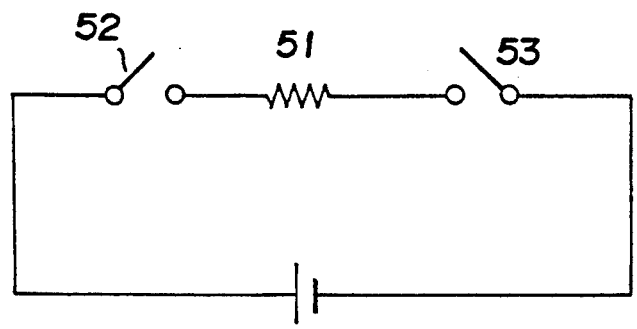
FIGS. 1 and 2 are each an illustration of the equivalent circuit of the electric cigar lighter without and with a thermal fuse, respectively.
Figure 2:
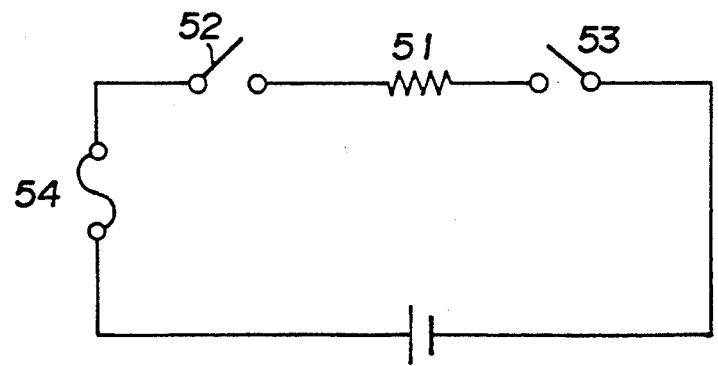
Figure 3:
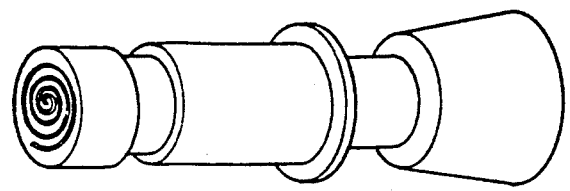
FIG. 3 is a perspective view of a heater element having a spiral heating filament and FIG. 4 is a perspective view of a prior art spring contact having a separate thermal fuse as disassembled into parts.
Figure 4:
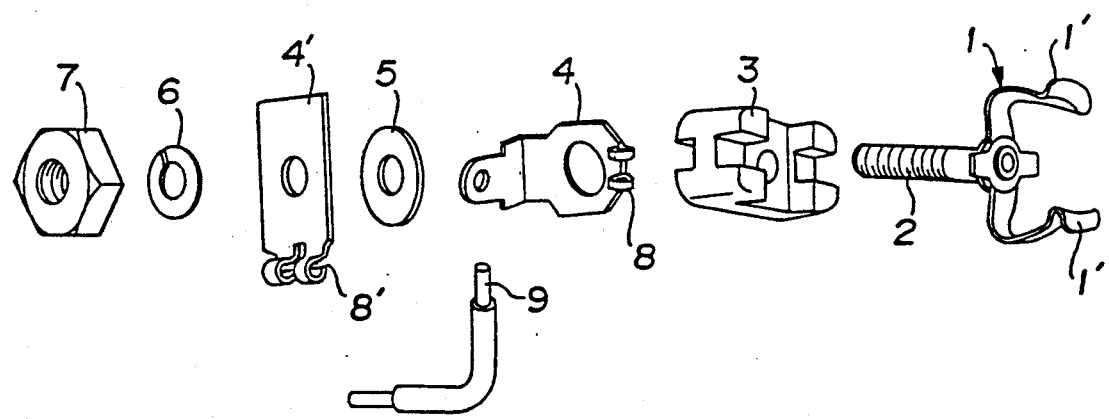
Figure 5:
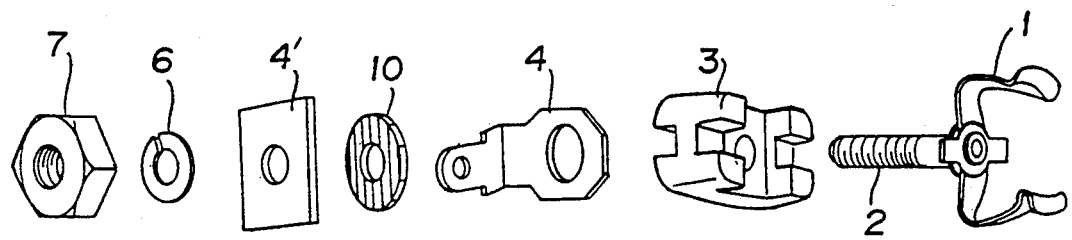
FIG. 5 is a perspective view of the spring contact according to the improvement of the invention having a spacer which serves also as a thermal fuse as disassembled into parts.

FIG. 5 illustrates a perspective view of an example of the spring contact disassembled into parts in an electric cigar lighter according to the improvement provided by the invention. The general structure of this spring contact is about the same as that of the conventional spring contact illustrated in FIG. 4 excepting the thermal fuse 9 and comprises the parts including a bimetal receptacle 1, a screw bolt 2, a ceramic insulator 3, a connecting lug plate 4, a connecting plate 4', a spring washer 6 and a nut 7 and they are fastened together by screwing the nut 7 to the screw bolt 2 penetrating the openings in the ceramic insulator 3, connecting plates 4,4' and spring washer 6 as well as a circuit-breakable conductive spacer 10 interposed between the connecting plates 4,4'. No thermal fuse 9 used in the conventional spring contact illustrated in FIG. 4 is used here.

Figure 6A:
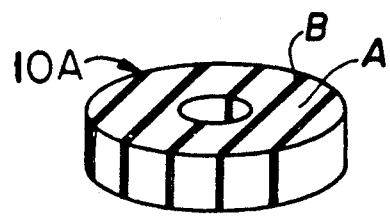
FIGS. 6a to 6h are each a perspective view of a spacer having differently disposed thermally-fusible conductive portions.

The circuit-breakable conductive spacer 10 has a form of a plate, as is typically illustrated by FIG. 6a, consisting of an electrically insulating portion A made from a heat resistant, form retaining rubber and forming the body of the plate and an electrically conductive portion B made from a metal or alloy having a low melting point and penetrating the matrix of the insulating portion A from one surface to the other so as to make an electrically conductive path between the connecting plates 4,4' when they are fastened together with the spacer 10 interposed therebetween while, when the spring contact is overheated, the conductive portion B made from a metal or alloy of low melting point is readily melted down to lose contact with the connecting plates 4,4' and open the electric circuit but the insulating rubbery portion A retains the form of the spacer plate so that the integral structure of the spring contact is unaffected with safety including the spacer 10 despite the failure in the electrical conduction.

The insulating portion A of the circuit-breakable conductive spacer 10 is made from an insulating material having elasticity. Various kinds of known materials meet the purpose including spongy and solid rubbers and rubbers reinforced with particulate or fibrous fillers of ceramics, glass, mica and the like and can be used without particular limitations. Solid or non-spongy rubbers are preferable in respect of the rubbery resilience to serve as a packing between the connecting plates 4,4'. Examples of suitable rubbers include natural rubber, isoprene rubber, styrene-butadiene copolymeric rubber, butadiene rubber, acrylonitrile-butadiene copolymeric rubber, chloroprene rubber, butyl rubber, acrylic rubber, urethane rubber, silicone rubber, fluorocarbon rubber, chlorinated polyethylene, ethylene-propylene copolymeric rubber, ethylenepropylenediene ternary copolymeric rubber, ethylene-vinyl acetate copolymeric rubber, epichlorohydrin rubber, thermoplastic elastomers, e.g., polystyrene-based, polyolefin-based, polyester-based, polyurethane-based and polyamide-based ones, and the like. Silicone rubbers are particularly preferable in respect of the good workability and high heat resistance regardless of the types of the mechanisms of the curing reaction.

The electrically conductive portion B in the circuit-breakable conductive spacer 10 is made from a metal or alloy having a low melting point which is determinant of the working temperature of the thermal fuse means. Various kinds of metals and alloys suitable for the purpose are known including, for example, zinc having a melting point of 420° C., indium having a melting point of 156° C., cadmium having a melting point of 320° C., tin having a melting point of 232° C., selenium having a melting point of 217° C., bismuth having a melting point of 271° C., thallium having a melting point of 303° C., lead having a melting point of 327° C., eutectic alloy of tin and lead having a melting point of 183° C. and eutectic alloy of gold and silicon having a melting point of 370° C. as well as eutectic alloys of gold and antimony and gold and indium and the like. Tin is particularly preferable because of the advantage that, in addition to the availability of tin foils of any desired thickness on the market, the oxide of tin, i.e. $SnO_2$, has a relatively low volume resistivity of $2.8 \times 10^{-4}$ ohm.cm not to cause substantial increase in the contact resistance between the tin-made portion and the connecting plates 4,4' even by the air oxidation of the surface thereof.

The circuit-breakable conductive spacer 10 should have such a structure that the conductive portion B is disposed to penetrate the matrix of the insulating portion A in the form of a plate from one surface to the other so that, when it is sandwiched between two connecting plates 4,4', electric conduction is established between the connecting plates 4,4'. The spacer 10 should have a center opening to be penetrated by the screw bolt 2, which should not be in contact with the conductive portions B in the spacer 10, and also should have an adequate elastic resilience to ensure firm assemblage of the parts into the spring contact.

FIGS. 6a to 6h each illustrate a perspective view of a circuit-breakable conductive spacer 10A–10H which the conductive portion or portions B are disposed in different arrangements in or on the insulating portion A. For example, the spacer 10A illustrated in FIG. 6a is prepared in the following manner. Thus, sheets A of an insulating rubber, e.g., silicone rubber, and foils B of a metal or alloy, e.g., tin, are alternately laid one on the other to form a laminated block by using an adhesive, if necessary and the block is then sliced with a plane perpendicular to the surface of the laminated layers to give a striped sheet which is punched into an annular form using a punching die. Each of the rubber sheets A and each of the tin foils B should preferably have a thickness in the range from 0.01 to 0.10 mm and the spacer 10 should have a thickness in the range from 0.2 to 3.0 mm or, preferably, from 0.5 to 2.0 mm though not particularly limitative thereto.

Figure 6B:
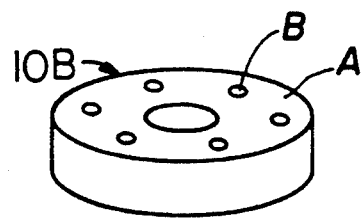
Figure 6C:
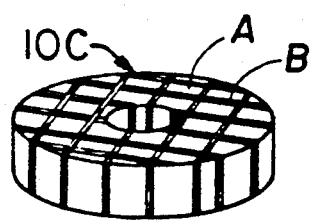
Figure 6D:
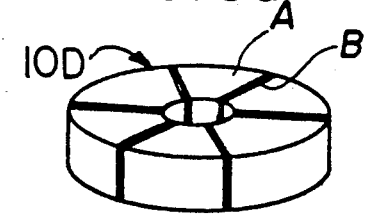

The spacer 10B illustrated in FIG. 6b can be prepared by filling a tubular mold, in which a number of wires B of a low melting point metal are spanned in parallel to the axis, with a flowable silicone rubber composition A which is subsequently cured to give a tubular rubber body and then slicing the tubular body having the wires embedded therein perpendicularly to the axis in a suitable thickness followed by punching to form a center opening. The spacers 106 and 108 illustrated in FIGS. 6c and 6d can be prepared in a manner similar to the above described procedure by filling the lattice-wise and radial assemblage, respectively, of metal foils B of low melting point with a flowable and curable silicone rubber composition A.

Figure 6E:
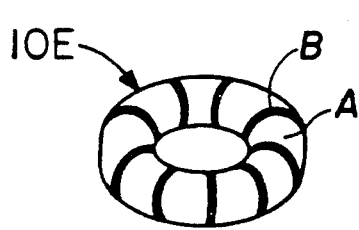
Figure 6F:
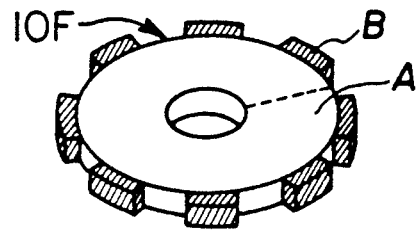
Figure 6G:
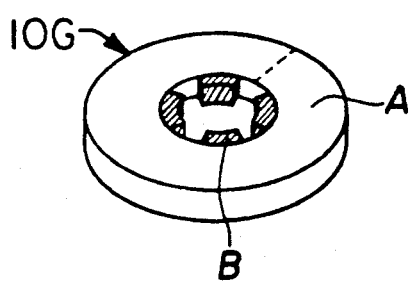
Figure 6H:
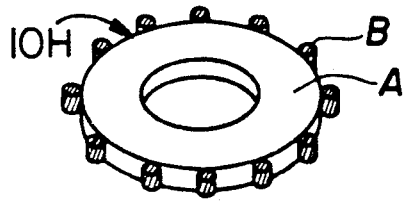

The spacer 10E illustrated in FIG. 6e is an O-ring-like rubber body A having a wire B of a low melting point metal wound around the ring A. The spacers 10F, 10G and 10H illustrated in FIGS. 6f, 6g and 6h each can be prepared by slicing a tubular rubber body A having a plurality of strips or wires B of a low melting point metal adhesively bonded to the outer, inner or outer surface, respectively, in parallel to each others in the axial direction. The above description for the preparation procedure of the spacers is only for the purpose of exemplification and they can be prepared in a variety of different procedures.

It is also possible that a woven sheet is prepared with insulating rubber threads A as the warps and wires of a low melting point metal B as the wefts and a tubular body obtained by rolling the sheet around the axis in the direction of the wefts by using an insulating adhesive, if necessary, is round-sliced to give a plate electrically conductive in the direction of the thickness only. In each of the above described different embodiments of the circuit-breakable conductive spacers, the foil or wire of the low melting point metal or alloy should have a thickness or diameter in the range from 0.01 to 0.10 mm or, in particular when tin is used, from 0.02 to 0.03 mm. When the thickness or diameter thereof is too large, the elastic resilience of the spacer to serve as a packing may be adversely affected. Foils and wires having a thickness or diameter smaller than above are, needless to say, disadvantageous in respect of the inconvenience in handling.

Figure 7:
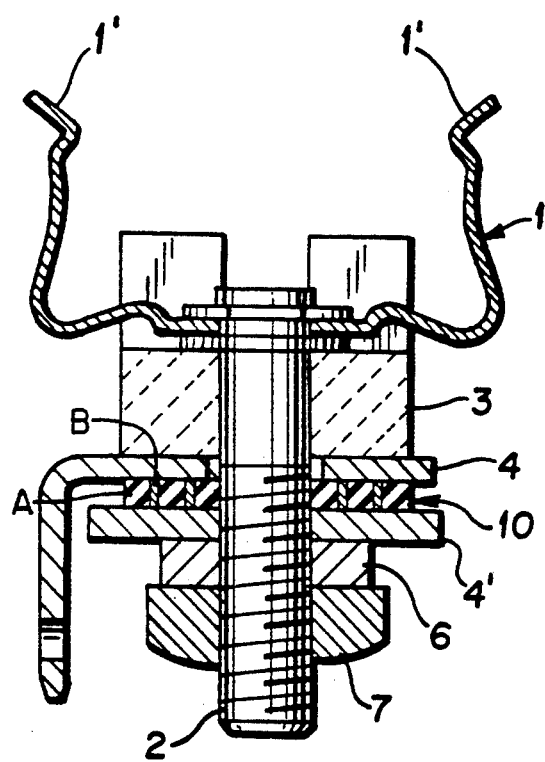
FIG. 7 is a fragmentary enlarged sectional view of the lower part of the lighter of this invention.

Referring to FIG. 7, there is shown a bimetal receptacle 1 having contact vanes 1', 1', a ceramic insulator 3 and the connecting plates 4, 4'. The bolt 2 penetrates through a central opening in the ceramic insulator 3 and the circuit breakable spacer 10 which is interposed between the connecting plates 4, 4'. The ceramic insulator 3, connecting plates 4, 4' and the spacer 10 are secured together by the bolt screw 2 held by the nut 7 which is retained by the spring washer 6.

The electric cigar lighter according to the inventive improvement is used by pushing and inserting the heater element into the spring contact so that the head of the heater element is contacted with the bimetal vanes 1',1' to close the electric circuit. In an accident that the electric circuit is not opened by the working of the bimetal vanes 1 ,1' even at an excessively high temperature to cause overheating, the conductive portions B in the circuit-breakable conductive spacer 10 made from a low melting point metal or alloy are melted down and lost from the spacer so as to open the electric circuit resulting in preventing further heat evolution. The spring contact working in the above described manner can be prepared by assembling the parts without using a separate thermal fuse so that the labor cost for the assemblage works can be greatly reduced with a possibility of automatization of the process of assemblage in addition to the advantages that caulking ears need not be formed in the connecting plates 4,4'.

In the following, an example is given to illustrate the electric cigar lighter according to the inventive improvement in more detail.

Example

A circuit breakable conductive spacer was prepared in the following manner. Thus, tin folis having a thickness of 0.03 mm (SNH, a product by Nakajima Metal Foils and Powders Industry Co.) were each uniformly coated on both surfaces with a solution of a primer for silicone rubber-metal adhesion (Primer No. 5, a product by Shin-Etsu Chemical Co.) diluted by 2 times with toluene followed by air drying at room temperature and then baking at 150° C. for 2 hours. Separately, curable silicone rubber sheets having a thickness of 1.0 mm were prepared by mixing a silicone rubber compound (KE 951U, a product by Shin-Etsu Chemical Co.) with 2% by weight of a curing agent (C-8, a product by the same company as above) on a mixing roller and sheeting in a calender roller.

The primer treated tin foils and the silicone rubber sheets were alternately laid one on the other to obtain a laminated block having a height of 50 mm which was heated in a hot press at 170° C. for 3 hours to effect curing of the silicone rubber sheets and adhesion of the sheets to the foils to form an integrally laminated block.

This laminated block was sliced in a plane perpendicular to the plane of the laminated layers into sheets having a thickness of 0.5 mm which were subjected to a post-curing treatment at 170° C. for 2 hours. The thus post-cured sheets were punched into an annular form as is illustrated in FIG. 6a having an outer diameter of 10 mm and an inner diameter of 4.5 mm to be used as a spacer.

The spacer was used in the assemblage of the spring contact illustrated in FIG. 5 as the circuit-breakable conductive spacer 10 interposed between the connecting plates 4,4'. The working time taken for this assemblage work was considerably shorter than in the assemblage work of the conventional spring contact with a separate thermal fuse 9 illustrated in FIG. 4. The electric resistance between the connecting plates 4,4' was smaller than 1 ohm, which value was substantially unaltered even after a test of repeated compression, to ensure red-heating of the spiral filament of the heater element inserted into the spring contact. When the heater element was overheated by an intentionally caused failure of working of the bimetal vanes 1',1' and the temperature of the spacer 10 had reached 280° C., the tin foils in the spacer were melted down to completely open the electric circuit.

What is claimed is:

1. In an electric cigar lighter consisting of a heater element having a heating filament and a spring contact, in which the electric circuit through the heating filament is closed when the heater element is pushed and inserted into the spring contact, and comprising, in the spring contact, two spaced apart electrically conductive connecting plates as part of the electric circuit fastened together with an electrically insulating spacer interposed therebetween and electrically connected through a thermal fuse means, the improvement where said spacer comprises a heat resistant resilient form-retaining plate formed from an electrically insulating rubbery material having opposite surfaces in contact with said connecting plates which is penetrated by at least one electrically conductive portion made form a metallic material having a low melting point extending between the surfaces in contact with the respective connecting plates establishing electrical conduction between the connecting plates so as to serve as said thermal fuse means by melting down of said at least one electrically conductive portion at a high temperature to break said electrical conduction between plates with the spacer retaining its plate form after said at least one conductive portion has melted to continue to serve as an electrically insulating spacer between said connecting plates.

2. The improvement as claimed in claim 1 in which the a metallic material having a low melting point is tin in the form of a foil.

3. The improvement as claimed in claim 2 in which the foil of tin has a thickness in the range from 20 to 30 $\mu$m.

4. The improvement as claimed in claim 1 in which the electrically insulating rubbery material is a silicone rubber.

5. The improvement as claimed in claim 1 in which the spacer has a thickness in the range from 0.2 to 3.0 mm.

* * * * *